United States Patent
Jaroschek

(10) Patent No.: US 10,109,931 B2
(45) Date of Patent: Oct. 23, 2018

(54) COVER ELEMENT FOR AN ELECTRICAL CONNECTOR

(71) Applicant: TE Connectivity Germany GmbH, Bensheim (DE)

(72) Inventor: Jens Jaroschek, Lenggries (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 15/591,200

(22) Filed: May 10, 2017

(65) Prior Publication Data

US 2017/0244179 A1    Aug. 24, 2017

Related U.S. Application Data

(63) Continuation of application No. PCT/EP2015/076052, filed on Nov. 9, 2015.

(30) Foreign Application Priority Data

Nov. 10, 2014 (DE) .......... 10 2014 222 879

(51) Int. Cl.
*H01R 4/70* (2006.01)
*H01R 4/36* (2006.01)
(Continued)

(52) U.S. Cl.
CPC .......... *H01R 4/36* (2013.01); *H01B 1/023* (2013.01); *H01B 1/12* (2013.01); *H01R 4/70* (2013.01); *H02G 15/18* (2013.01)

(58) Field of Classification Search
CPC ........ H01R 4/30; H01R 4/36; H01R 13/5213; F16B 37/14; F16B 35/005;
(Continued)

(56) References Cited

U.S. PATENT DOCUMENTS 446,741 A * 2/1891 Jones .......... F16B 35/005
411/393
2,068,152 A   1/1937 Rowe
(Continued)

FOREIGN PATENT DOCUMENTS

EP   1443621 A1   8/2004
GB   2251984 B    8/1994
(Continued)

OTHER PUBLICATIONS

PCT Written Opinion of the International Searching Authority, dated Feb. 16, 2016, 11 pages.
(Continued)

*Primary Examiner* — Chau N Nguyen
*Assistant Examiner* — Roshn Varghese
(74) *Attorney, Agent, or Firm* — Barley Snyder

(57) ABSTRACT

A cover for an electrical connector comprises a cylindrical disc including a first cover surface, an opposite second cover surface, and a barrel surface extending between the first cover surface and the second cover surface. The first cover surface has a convex form. In a state in which the cover is mounted on the electrical connector, the first cover surface forms a portion of an outer surface of the electrical connector and the second cover surface faces an inner side of the electrical connector.

9 Claims, 4 Drawing Sheets

(51) Int. Cl.
*H01B 1/02* (2006.01)
*H01B 1/12* (2006.01)
*H02G 15/18* (2006.01)

(58) Field of Classification Search
CPC ......... Y10T 403/0847; Y10T 403/1472; Y10T 403/15; Y10T 403/5741; Y10T 403/7041; Y10T 403/7084
USPC .......... 403/10, 362; 439/431, 801, 810, 309, 439/793, 797, 798, 814; 411/372.5–373, 411/380, 393, 417; 174/138 F
See application file for complete search history.

(56) References Cited

U.S. PATENT DOCUMENTS

| | | | | |
|---|---|---|---|---|
| 4,223,179 | A * | 9/1980 | Lusk | H01R 4/30 439/814 |
| 4,269,465 | A * | 5/1981 | Mueller | H01R 4/36 439/431 |
| 4,391,028 | A | 7/1983 | Choudhury | |
| 4,479,489 | A * | 10/1984 | Tucci | A61N 1/3752 607/37 |
| 4,764,132 | A | 8/1988 | Stutz, Jr. | |
| 4,784,141 | A * | 11/1988 | Peers-Trevarton | A61N 1/3752 439/784 |
| 4,884,929 | A * | 12/1989 | Smith | B64D 45/02 411/3 |
| 5,201,914 | A | 4/1993 | Hollick | |
| 5,391,028 | A * | 2/1995 | Charles | F16B 37/145 411/374 |
| 5,533,912 | A * | 7/1996 | Fillinger | H01R 13/5205 439/521 |
| 5,821,463 | A | 10/1998 | Ngo | |
| 5,989,077 | A * | 11/1999 | Mast | A61N 1/3752 439/804 |
| 7,537,467 | B1 * | 5/2009 | Gretz | H01R 4/36 439/108 |
| 2009/0053940 | A1 | 2/2009 | Sweeney et al. | |

FOREIGN PATENT DOCUMENTS

| | | |
|---|---|---|
| WO | 2014095563 A1 | 6/2014 |
| WO | 2016075075 A1 | 5/2016 |

OTHER PUBLICATIONS

Atlantic Fasteners: "Set screw point styles", Dec. 31, 2012, XP055247650, Retrieved from the Internet: URL: http://www.atlanticfasteners.com/tech-tips/set-screw-point-styles-and-their-use/ [retrieved on Feb. 4, 2016], 3 pages.

European Patent Office Action, dated Mar. 26, 2018, 8 pages.

Chinese First Office Action and English translation, dated Jul. 4, 2018, 20 pages.

* cited by examiner

COVER ELEMENT FOR AN ELECTRICAL CONNECTOR

CROSS-REFERENCE TO RELATED APPLICATIONS

This application is a continuation of PCT International Application No. PCT/EP2015/076052, filed on Nov. 9, 2015, which claims priority under 35 U.S.C. § 119 to German Patent Application No. 102014222879.4, filed on Nov. 10, 2014.

FIELD OF THE INVENTION

The present invention relates to a cover and, more particularly, to a cover for an electrical connector.

BACKGROUND

Known electrical connectors are frequently employed in the field of high-voltage power transmission to interconnect cables or to finish cable ends. For example, mechanical and electrical interconnecting of two cable ends is known from U.S. Pat. No. 5,201,914 by introducing the cable ends into a tubular, electrically conductive sheath and fixing them in the sheath using screws. The screws are each guided in a borehole which extends radially from the direction of the central axis of the sheath.

Covering such cable connections between electrical cables using electrically insulating elastic sleeves is also known. Alongside the impact protection and protection from the penetration of moisture, the insulative sleeve also controls the electrical field by shielding. Mounting such a sleeve in the region of the cable connector can consist of expanding a silicon rubber sheath using a spiral system and allowing the sleeve to shrink to its desired diameter by destroying or removing the spiral. Alternatively, it is also possible to use a warm-shrinking material instead of the spiral, as is described in WO 2014/095563 A1, for example. In another alternative, an elastic sheath can be mounted by pushing it in the longitudinal direction over the cable connector; in order to make this possible, a lubricant, for example silicone grease, must be applied in order to reduce the friction.

The latter mounting method is advantageous in that, on the one hand, no additional spiral is required and therefore waste is avoided, and on the other hand, no heat source is required. However, in order to be able to easily push an elastic sleeve over the electrical connector, it is essential that the cable connector has a sufficiently smooth outer surface. Even small projections, apertures or uneven areas can lead to an interruption of the lubricating film and disrupt the mounting process.

In order to avoid the smooth surface of the cable connector being interrupted by protruding screw heads, for example, screws with a predetermined breaking point may be used, the heads of which shear off when a defined torque is exceeded. In this manner, the surface of the cable connector no longer has any screw heads, but it does have open recesses into which the silicone grease penetrates, so that the lubricating film is interrupted.

SUMMARY

An object of the invention, among others, is to provide a cover for an electrical connector with a simplified mounting of the cover on the connector and an improved closed connection. A cover for an electrical connector according to the invention comprises a cylindrical disc including a first cover surface, an opposite second cover surface, and a barrel surface extending between the first cover surface and the second cover surface. The first cover surface has a convex form. In a state in which the cover is mounted on the electrical connector, the first cover surface forms a portion of an outer surface of the electrical connector and the second cover surface faces an inner side of the electrical connector.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
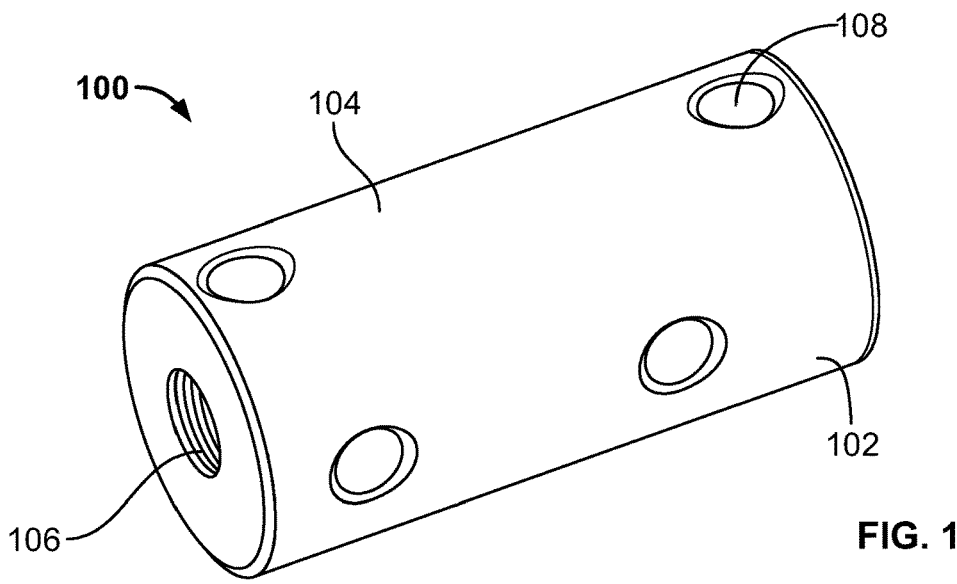
FIG. 1 is a perspective view of an electrical connector according to the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

An electrical connector 100 according to the invention is shown in FIG. 1. The electrical connector 100 is used to connect two high-voltage cables. The electrical connector 100 has a substantially hollow cylindrical connector sheath 102 with an outer surface 104 in the shape of a cylinder barrel. The connector sheath 102 has a cable receiver 106 with a pair of opposite end sections, each end section of the cable receiver 106 receiving one of the cables to be connected. The connector sheath 102 also has a plurality of boreholes 108 disposed along the outer surface 104 and extending from the outer surface 104 into the cable receiver 106. Each borehole 108, as shown in FIG. 2, has either an inner thread 109 or a smooth inner surface 107.

Figure 2:
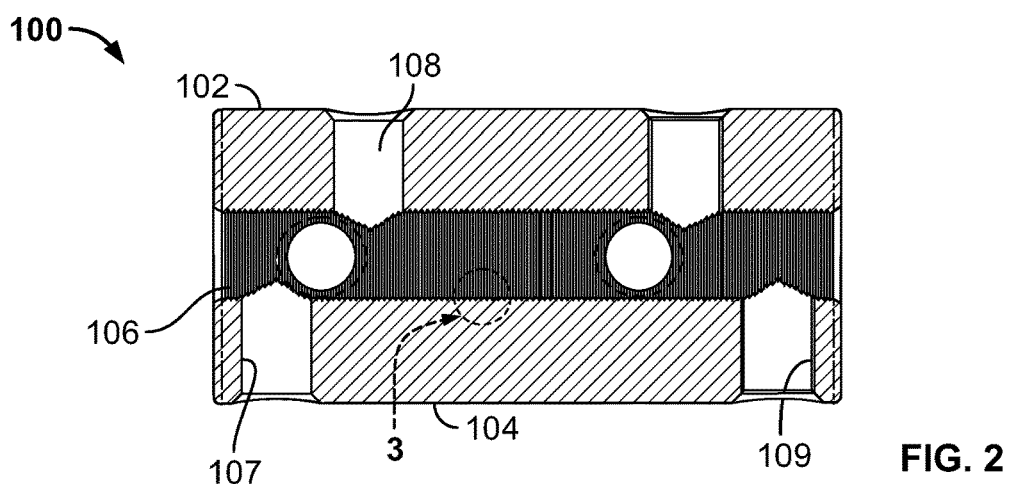
FIG. 2 is a sectional view of the connector of FIG. 1.
Figure 3:
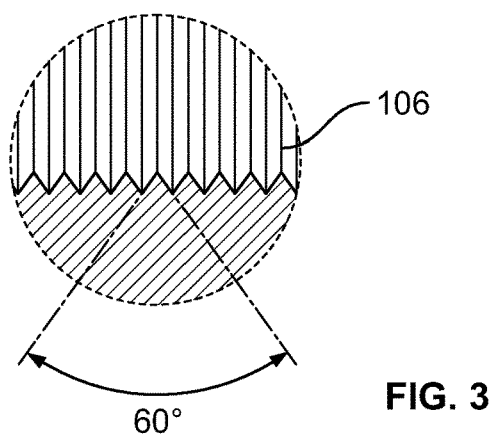
FIG. 3 is a detail view of a portion of the connector of FIG. 2.

The cable receiver 106, as shown in FIG. 2, extends through the entire length of the connector sheath 102. An inner surface of the cable receiver 106, as shown in FIGS. 2 and 3, has a 60° zig-zag profile. The profile raises a contact surface to the cable and forms a storage space for a lubricant and/or contact grease. Alternatively, threaded structures or other roughening structures known to those with ordinary skill in the art could be disposed on the inner surface of the cable receiver 106.

The cables to be connected are each pushed in the cable receiver 106 from the two opposing end sections up to the middle of the connector sheath 102 and are fixed in the connector sheath 102 by a plurality of screws disposed in the boreholes 108. The screws are breakaway screws, the screw head of which shears off when a defined torque is exceeded. After the breakaway screws are mounted in the boreholes 108, an outer region of each borehole 108 initially has a recess from the sheared off screw head, so that when an elastic sleeve is mounted, a lubricant penetrates into a lubricant portion of the recess.

Figure 4:
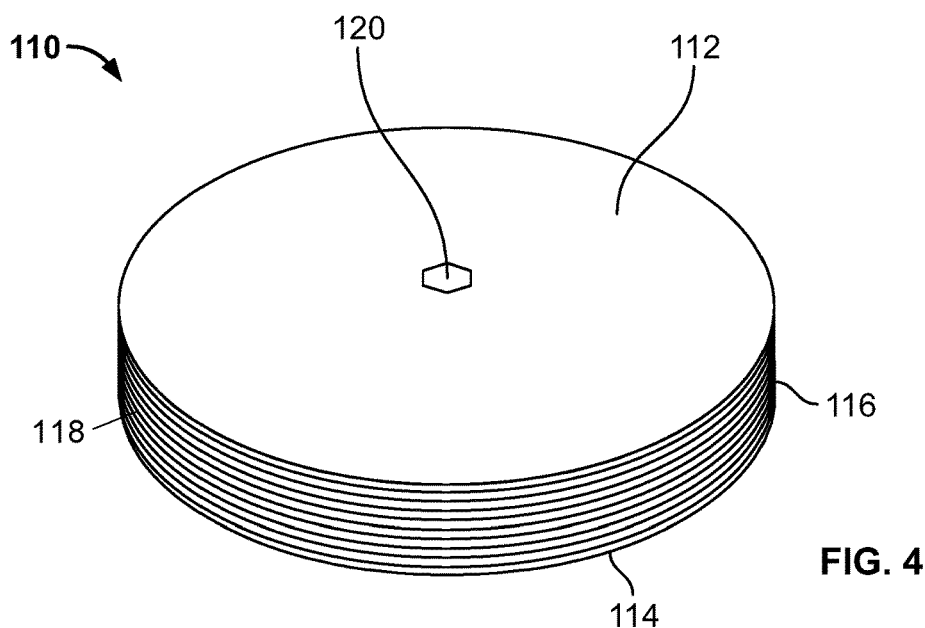
FIG. 4 is a perspective view of a cover according to the invention.

A remaining portion of the recess of each borehole 108 is sealed with a cover 110 shown in FIG. 4. The cover 110 is a relatively flat, cylindrical disc with a first and a second cover surface 112, 114. A barrel surface 116 of the cylindrical cover 110 extending between the cover surfaces 112, 114 has an outer thread 118 complementary to the inner thread 109 on the borehole 108. Alternatively, instead of the outer thread 118, a press fit can be used in order to fix the cover 110 in the borehole 108 with the smooth inner surface 107 at the correct position.

Figure 5:
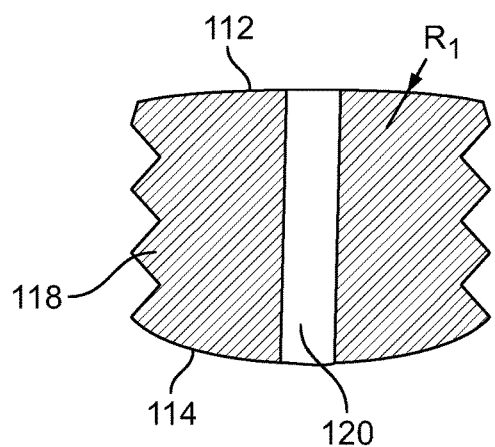
FIG. 5 is a sectional view of the cover of FIG. 4.
Figure 6:
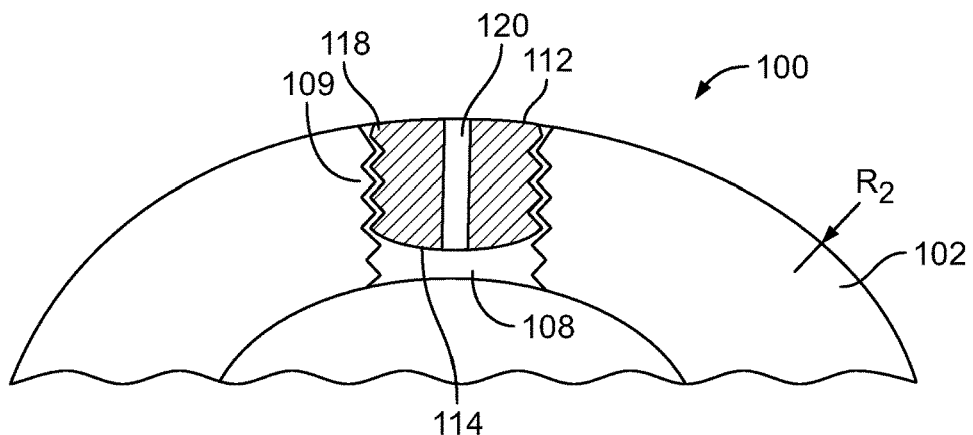
FIG. 6 is a radial sectional view of the cover of FIG. 4 mounted on the electrical connector of FIG. 1.

The first cover surface 112, as shown in FIGS. 5 and 6, is not flat but rather is convexly arched towards an outer surface 104 of the connector 100. As shown in FIG. 6, a cover 110 fully mounted in the borehole 108 completes the curved outer surface 104 of the connector sheath 102. The connector 100 has a largely smooth outer surface 104, 112 over which an elastic, electrically insulating sleeve can be easily pushed using a lubricant. There are no noteworthy recesses in which the lubricant could be lost. The second cover surface 114 faces toward an inside of the electrical connector 100.

Figure 7:
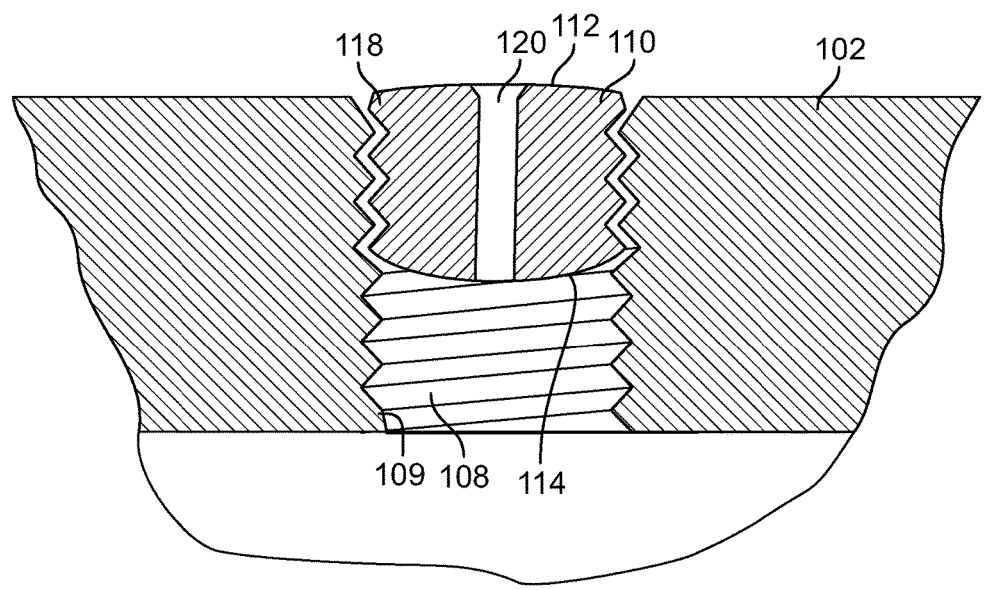
FIG. 7 is a longitudinal sectional view of the cover of FIG. 4 mounted on the electrical connector of FIG. 1.

The first cover surface 112 has the form of a part of a cylinder barrel surface, with its radius R1 corresponding to the radius R2 of the connector sheath 102. The first cover surface 112, as shown in FIG. 7, is not curved in the longitudinal direction of the connector sheath 102 to also fit the outer surface 104 in the longitudinal direction. The second cover surface 114 can be level or symmetrical to the first cover surface 112.

Figure 9:
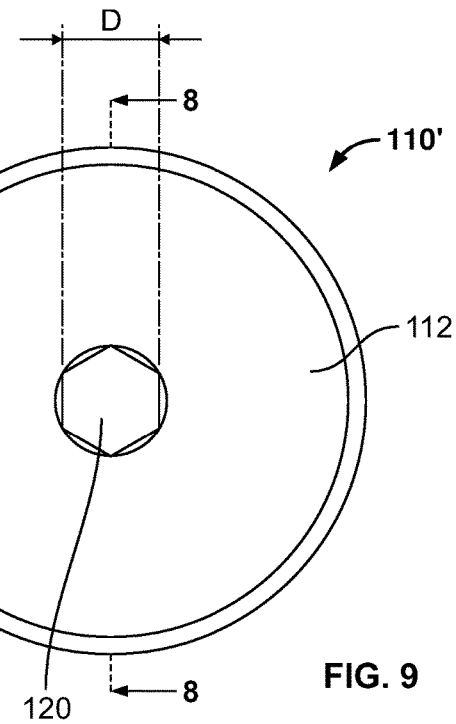
FIG. 9 is a plan view of the cover of FIG. 8.

The cover 110 has an actuator 120, shown in FIGS. 4-7, which facilitates the mounting of the cover 110 in the borehole 108. The actuator 120 has a driving profile such as an inner hexagonal socket profile, for example. The driving profile may alternatively be a star profile, a tri-wing profile, or other driving profiles known to those with ordinary skill in the art. The cover 110 is actuated at the actuator 120 by an associated tool, for example, a suitable key with matching outer profile to the actuator 120. A diameter D of the actuator 120, as shown in FIG. 9, does not exceed a certain maximum size such that, when an elastic, electrically insulating sleeve is pushed on, lubricant does not penetrate into the actuator 120 in sufficient quantities to rip off a lubricating film. Depending on the consistency of the lubricant used and the overall dimensions of the connector 100, the diameter D is less than approximately 20% of the borehole 108 diameter.

For the cover 110 to bring about as homogeneous an outer surface 104 of the electrical connector 100 as possible, the cover 110 is produced from a same electrically conductive material as the connector sheath 102. In the shown embodiment, the cover 110 and the sheath 102 are formed from a metal, for example aluminum. Alternatively, electrically conductive plastics such as metal-filled or graphite-filled plastics may also be used.

Figure 8:
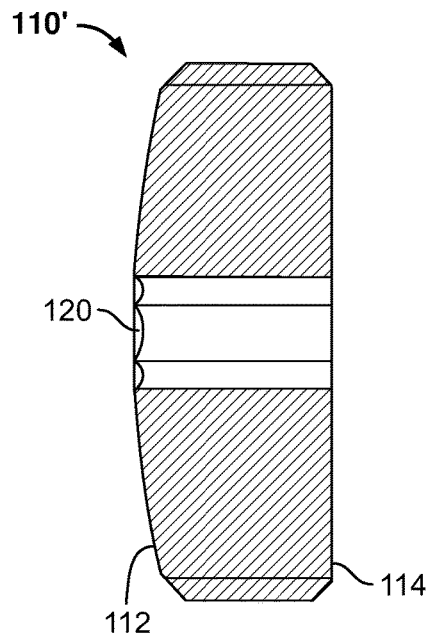
FIG. 8 is a sectional view of a cover according to another embodiment of the invention.
Figure 10:
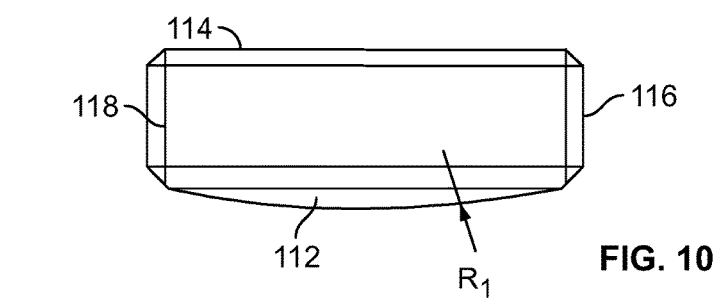
FIG. 10 is a side view of the cover of FIG. 8.

A cover 110' according to another embodiment of the invention is shown in FIGS. 8-10. The first cover surface 112 of the cover 110' is formed as a sector of a spherical surface instead of from a cylindrical barrel surface. The cover 110' is rotationally symmetrical. Similarly to the first embodiment in which the first cover surface 112 represents a sector from a cylinder barrel surface, the radius R1 of this sphere corresponds to the radius R2 of the connector sheath 102. In contrast to the first embodiment, the cover 110' according to the second embodiment also has this curvature in the longitudinal direction. The cover 110', as shown in FIGS. 8 and 10, has beveled edges to avoid ridges or roughness.

Advantageously, in the electrical connector 100 according to the invention having the cover 110, 110' in the boreholes 108, the boreholes 108 neither have sharp edges which could cause electrical problems nor represent an undesired cavity for a lubricant required when a cover sleeve is being pushed on.

What is claimed is:

1. An electrical connector for connecting or finishing at least one cable, comprising:
   an electrically conductive connector sheath having a borehole and a cable receiver receiving an end section of the cable; and
   a cover having a cylindrical disc including a first cover surface with a convex form having a cylindrical or spherical curvature and a radius corresponding to an outer radius of the connector sheath, an opposite second cover surface, and a barrel surface extending between the first cover surface and the second cover surface, the first cover surface having a same diameter as the second cover surface, and in a state in which the cover is mounted on the electrical connector and received in the borehole, the first cover surface forms a portion of an outer surface of the electrical connector and the second cover surface faces an inner side of the electrical connector.

2. The electrical connector of claim 1, wherein the borehole receives a fixing element which fixes the cable in the cable receiver.

3. The electrical connector of claim 1, wherein the barrel surface has an outer thread.

4. The electrical connector of claim 3, wherein the borehole has an inner surface, the outer thread of the barrel surface engaging with the inner surface of the borehole to fix the cover in the borehole.

5. The electrical connector of claim 1, wherein the cover is formed from an electrically conductive material.

6. The electrical connector of claim 5, wherein the electrically conductive material is aluminum or a conductive plastic.

7. The electrical connector of claim 1, wherein the cover has an actuator for mounting or demounting the cover in the borehole.

8. The electrical connector of claim 7, wherein the actuator has a driving profile engaging a corresponding tool.

9. The electrical connector of claim 1, wherein the convex form of the first cover surface is fixed with respect to the cylindrical disc.

* * * * *